No. 723,568. PATENTED MAR. 24, 1903.
E. F. W. WIEDA.
KNEADING AND MIXING MACHINE.
APPLICATION FILED MAY 2, 1902.
NO MODEL. 3 SHEETS—SHEET 1.
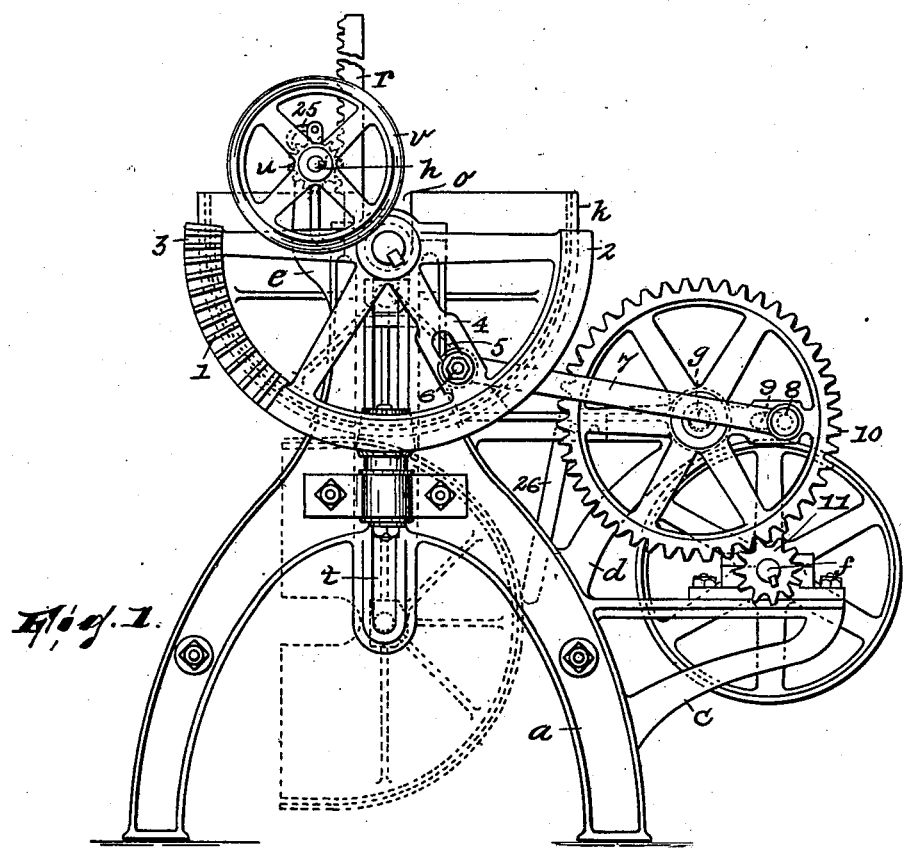
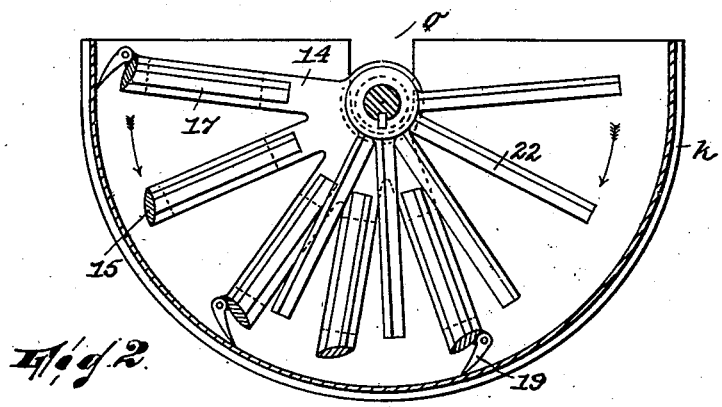
WITNESSES: INVENTOR,
Ernst F. W. Wieda,
BY
Gartner & Stewards,
ATTORNEYS.

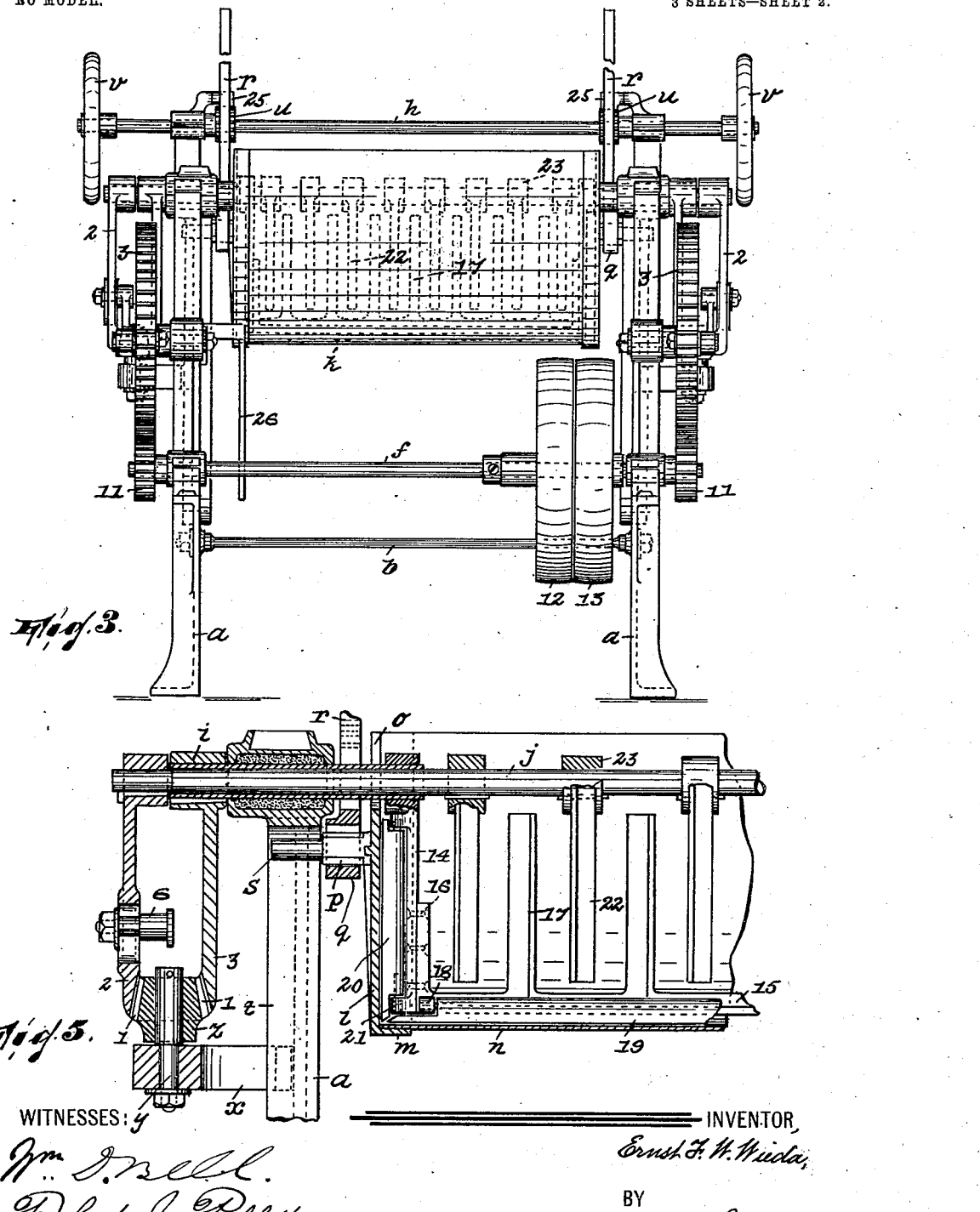

No. 723,568. PATENTED MAR. 24, 1903.
E. F. W. WIEDA.
KNEADING AND MIXING MACHINE.
APPLICATION FILED MAY 2, 1902.
NO MODEL. 3 SHEETS—SHEET 3.
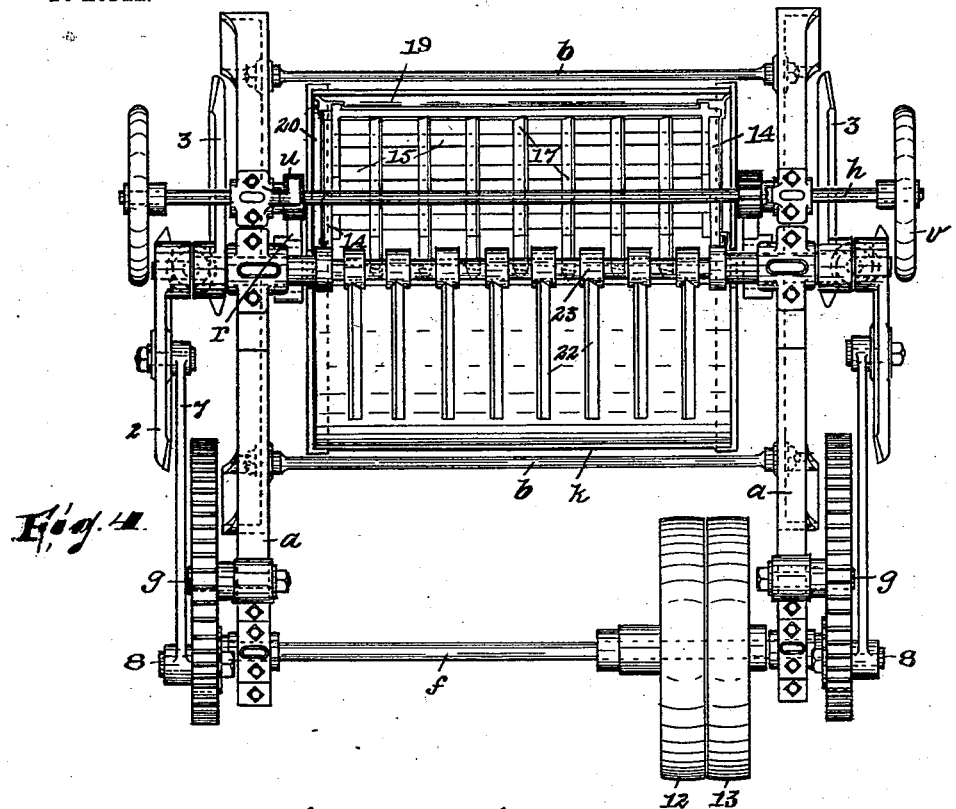
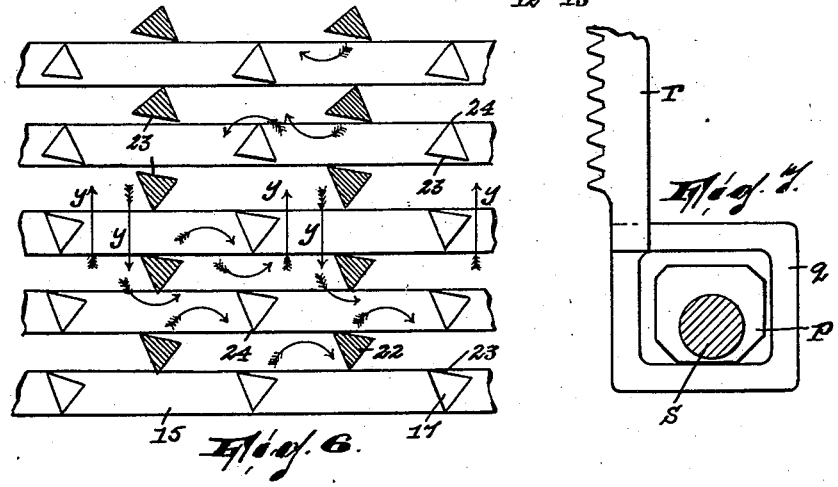
WITNESSES: INVENTOR,
Ernst F. W. Wieda,
BY
Gartner & Steward,
ATTORNEYS.

UNITED STATES PATENT OFFICE.

ERNST F. W. WIEDA, OF PATERSON, NEW JERSEY.

KNEADING AND MIXING MACHINE.

SPECIFICATION forming part of Letters Patent No. 723,568, dated March 24, 1903.

Application filed May 2, 1902. Serial No. 105,602. (No model.)

*To all whom it may concern:*

Be it known that I, ERNST F. W. WIEDA, a citizen of the United States, residing in Paterson, in the county of Passaic and State of New Jersey, have invented certain new and useful Improvements in Kneading and Mixing Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to machines for mixing candy and other similar materials; and it consists in certain improvements in machines of this nature which will be found hereinafter set forth in the clauses of the claim and which are specifically presented in one embodiment of the invention in the following specification and accompanying drawings.

In said drawings, in which corresponding reference characters indicate like parts, Figure 1 is a view in side elevation of my improved machine. Fig. 2 is a longitudinal vertical sectional view of the mixing mechanism proper of the machine. Fig. 3 is a rear view of the machine. Fig. 4 is a top plan view. Fig. 5 is a slightly-enlarged transverse vertical sectional view of the mixing mechanism proper and a portion of its operating means, and Figs. 6 and 7 illustrate details of the invention.

The frame of the machine comprises two uprights $a$, connected together by suitable braces $b$ as also by certain shafts and other parts hereinafter described. These uprights are provided with pairs of rests $c$, $d$, and $e$, respectively, serving as bearings for shafts $f$, $g$, and $h$. The uprights themselves in their top portions provide bearings for alined sleeves $i$, in which are revolubly mounted the end portions of the main shaft $j$.

$k$ is a suitable vessel formed of two substantially semicircular heads $l$, having inwardly-projecting flanges $m$ on their curved edges, which flanges support the sheet-metal body portion $n$ of the vessel. The vessel is adapted to be raised and lowered, being disposed between the uprights $a$, and in order that when elevated it may receive the shaft $j$ its heads $l$ are formed with vertical openings $o$.

From the heads $l$ project trunnions $p$, which are received by the stirrups $q$ of vertically-movable racks $r$. The trunnions $p$ are not round in cross-section, but are octagonal or any other suitable form, so that the faces thus produced thereon will coact with the inside supporting-face of the corresponding stirrup to keep the vessel in a tilted as well as in a horizontal position until force is intentionally applied to move it. The trunnions $p$ are formed with integral extensions $s$, which constitute guides that are received by vertical slots $t$, formed in the uprights $a$. Thus the guides and slots insure true rectilineal movement to the vessel when it is raised or lowered. The teeth of the racks engage the teeth of pinions $u$, which are carried on the shaft $h$, journaled in the rests $e$. By so disposing the shaft $h$ that the racks can just move vertically between the pinions and the sleeves $i$ said sleeves will be made to act as guides for the racks, such as will always insure their proper engagement with the teeth of the pinions.

$v$ indicates hand-wheels secured on the shaft $h$ and serving as a means for manually rotating said shaft. It will be understood that the bottoms of the slots $t$ are closed, so that, as at $w$, the uprights $a$ provide stops for the guides $s$.

From each upright $a$ projects outwardly a step-bearing $x$, which carries a spindle $y$, on which is journaled a beveled pinion $z$. With this pinion meshes the toothed peripheral portions 1 of pairs of segments 2 3. The pair of segments 2 is keyed on the shaft $j$, while the other pair of segments 3 is keyed, each of them, on a sleeve $i$. By means of the pinions $z$ any motion in one of the pair of segments will produce in the other pair of segments a movement in the opposite direction.

One of the spokes 4 of each segment 2 is formed with a radial slot 5, in which is adjustably secured a stud 6. A connecting-rod 7 joins this stud with a crank-pin 8, arranged adjustably in a slot 9 of each of a pair of gears 10, which are journaled on the shafts 9, said gears being adapted to be driven from pinions 11, carried on the shaft $f$, which is journaled in the stands c. It should be remarked that the shaft f carries the fast and loose pulleys 12 and 13, by the former of which the power is taken into the machine.

From the sleeves i project several pairs of arms 14, the ends of which in each pair are connected by blades 15, which are riveted thereto, as at 16, Fig. 5, as seen in Fig. 2. These blades are substantially ovoid-shaped, as seen in section.

17 represents agitators which project inwardly from the blades toward the shaft j. Several of the blades are formed with lugs 18, in which are pivoted scrapers 19, having their scraping edges projecting inwardly, as seen in Fig. 2, it being their function to keep the material cleaned off the inside surface of the body portion n of the vessel. Similar scrapers 20 are pivoted in lugs 21 of the arms 14, being designed to keep clean the inside surfaces of the heads l of the vessel.

22 represents other agitators which alternate with the first-named agitators 17 and are arranged in sets, carried each set by a collar 23, secured rigidly on the shaft j.

It should be remarked that regarding the series of blades 15 as consisting of two sets those of each set have their inner edges nearer the body portion n of the vessel than their outer edges. The result is that the blades thus act to impel the material being acted on inwardly, this action being augmented by the scrapers 19 and 20. It should also be remarked that the various agitators 17 and 22 are triangular in cross-section and that regarding the several agitators 17 as one set and the agitators 22 as another set each comprises two groups (separated by a plane which includes the axial line in shaft j) having their acting faces 23 so arranged obliquely to said axial line that when working the agitators of one group will deflect the material as they force their way through it in a direction opposite to that in which the other group of agitators deflect the material, the result being the maintaining of a constant circulation. This is illustrated in one form in Fig. 6, where the oblique acting faces 23 of the two groups in each set are on the inner sides of the agitators and have their right-hand edges (viewing them according to the direction in which they are indicated to move by arrows y) rearmost, so that when working each group of agitators will deflect the material to its right.

There being two sets of agitators, the effect above described is simply duplicated or multiplied, the gearing connecting the two sets of agitators being so arranged that they work in opposite directions.

By forming the agitators so that they have triangular cross-sections their rear positions (designated by character 24 on the drawings) act to facilitate the receding movement of the agitators by cutting their way through the material and also to augment the circulating action. The circulation in the material thus made possible is of considerable importance, since it insures the bringing of every particle of the material under the direct influence of the agitators, so that the mixing may be carried to the maximum degree of completeness.

25 represents simply pawls pivoted on the rests e and adapted to engage the adjoining pinions u to prevent the shaft h from turning, and thus keep the vessel elevated while the mixing operation is going on.

26 is an inclined trip secured to the frame a and so arranged in the path of the rear portion of the vessel that when it is lowered it will engage it, and thus cause the vessel to be turned on its bearings into the dotted-line position shown in Fig. 1.

The machine operates as follows: Power being applied to the machine through pulley 12 and shaft f, the gearing connecting the segments 2 with said shaft f produces, as will be obvious, the oscillation of said segments, said oscillation being in turn transmitted through the pinions z to the other segments 3. As has been already intimated, the segments and the agitators which they control are set so that they oscillate in opposite directions. Thus the agitators are kept in motion, and by virtue of their peculiar construction and arrangement they are made to produce the peculiar effect on the material being operated upon which has been already sufficiently described.

In order to get at the interior of the vessel, either to fill it or empty it or clean it, &c., and in order to have free access to that portion of the mixing mechanism which is adapted to be received by the vessel, the latter may be lowered clear of the agitators by simply releasing pawls 25 from engagement with the pinions u, so that the pinions will be free to turn. As the vessel drops its rear side will engage the trip 26, which will cause it to turn on its bearings into the dotted-line position illustrated in Fig. 1. In restoring the vessel to its initial position after having been filled with the new supply of material to be mixed the operation is simply reversed, the racks r, pinions u, and hand-wheels v being made use of as an elevating means.

Having thus fully described my invention, what I claim as new, and desire to secure by Letters Patent, is—

1. In a candy-mixing or other similar machine, the combination, with a frame, of a vessel for receiving the material to be operated upon, agitating mechanism adapted to be received by said vessel, supporting means for said vessel, said vessel being pivotally arranged in said supporting means, and means for raising and lowering said supporting means and by it said vessel, substantially as described.

2. In a candy-mixing or other similar machine, the combination, with a frame, of a vessel for receiving the material to be operated upon, supporting means for said vessel, agitators, a shaft carrying said agitators and journaled in said frame, said vessel being adapted to receive the agitators and being pivotally arranged in said supporting means, means for actuating said agitators, and means for raising and lowering said supporting means and by it said vessel, substantially as described.

3. In a candy-mixing or other similar machine, the combination, with a frame, of a vessel for receiving, and mechanism for agitating, the material to be operated upon, said mechanism being adapted to be received by the vessel and said vessel being movable into and out of operative position relatively to the mechanism and being also pivotally mounted, and a trip adapted to engage said vessel eccentrically to turn the same on its pivot, substantially as described.

4. In a candy or other similar mixing machine, the combination, with a frame, of a vessel for receiving the material to be operated upon, sets of agitators adapted to oscillate in reverse directions and arranged in said vessel, segmental members, an intermediate rotary part engaging said members and revoluble in opposite directions to oscillate the same, and operative connecting means between each member and one of the sets of agitators, substantially as described.

5. In a candy-mixing or other similar machine, the combination, with a frame, of a vessel for receiving the material to be operated upon, sets of agitators adapted to oscillate in reverse directions and arranged in said vessel, toothed segments, an intermediate pinion engaging said segments, and operative connecting means between each segment and one of the sets of agitators, substantially as described.

6. In a mixing or other similar machine adapted in operation to maintain a constant circulation in the material being operated upon in a given direction, a set of oscillatory agitators arranged in different radial planes and having their acting faces set obliquely, those in one plane oppositely to those in the other, substantially as described.

7. In a mixing or other similar machine adapted in operation to maintain a constant circulation in the material being operated upon in a given direction, a set of oscillatory agitators arranged in different radial planes and having their acting faces set obliquely, those in one plane oppositely to those in the other, and said agitators having their rear faces convergent, substantially as described.

8. In a candy-mixing or other similar machine, the combination, with a frame, of a vessel for receiving the material to be operated upon, sets of agitators adapted to oscillate in reverse directions about a common axis and arranged in said vessel radially relatively to said axis, and means for actuating said agitators, substantially as described.

9. In a candy-mixing or other similar machine, the combination, with a frame, of a vessel for receiving the material to be operated upon, sets of agitators adapted to oscillate in reverse directions about a common axis and arranged in said vessel radially relatively to said axis, the agitators of one set projecting from said axis and the other toward the same, and means for actuating said agitators, substantially as described.

In testimony that I claim the foregoing I have hereunto set my hand this 30th day of April, 1902.

ERNST F. W. WIEDA.

Witnesses:
JOHN W. STEWARD,
ROBERT J. POLLITT.